(12) United States Patent
Harayama et al.

(10) Patent No.: US 11,108,078 B2
(45) Date of Patent: Aug. 31, 2021

(54) NONAQUEOUS ELECTROLYTE SECONDARY BATTERY AND MANUFACTURING METHOD THEREFOR

(71) Applicant: TOYOTA JIDOSHA KABUSHIKI KAISHA, Toyota (JP)

(72) Inventors: Takashi Harayama, Toyota (JP); Ryo Hanasaki, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 10 days.

(21) Appl. No.: 16/281,542

(22) Filed: Feb. 21, 2019

(65) Prior Publication Data

US 2019/0190062 A1 Jun. 20, 2019

Related U.S. Application Data

(62) Division of application No. 15/518,352, filed as application No. PCT/IB2015/001910 on Oct. 16, 2015, now abandoned.

(30) Foreign Application Priority Data

Oct. 17, 2014 (JP) .................. 2014-212860

(51) Int. Cl.
*H01M 10/0525* (2010.01)
*H01M 50/46* (2021.01)

(52) U.S. Cl.
CPC ..... *H01M 10/0525* (2013.01); *H01M 50/461* (2021.01); *Y02T 10/70* (2013.01)

(58) Field of Classification Search
CPC ................................ H01M 10/0525
See application file for complete search history.

(56) References Cited

U.S. PATENT DOCUMENTS 6,589,690 B1 7/2003 Sato et al.
2007/0231700 A1 10/2007 Watanabe

FOREIGN PATENT DOCUMENTS

| CN | 1244296 A | * | 2/2000 | ........ H01M 10/0525 |
|---|---|---|---|---|
| CN | 1244296 A | | 2/2000 | |
| EP | 1022798 A2 | | 7/2000 | |
| EP | 1043782 A2 | | 10/2000 | |
| JP | 5-159802 A | | 6/1993 | |
| JP | H05159802 | * | 6/1993 | ........ H01M 10/0562 |
| JP | 2000-348776 A | | 12/2000 | |
| JP | 2003-151638 A | | 5/2003 | |
| JP | 2007-273123 A | | 10/2007 | |
| JP | 2013-137943 A | | 7/2013 | |
| JP | 2014-120456 A | | 6/2014 | |

(Continued)

*Primary Examiner* — Karie O'Neill Apicella
(74) *Attorney, Agent, or Firm* — Sughrue Mion, PLLC (57) ABSTRACT

A nonaqueous electrolyte secondary battery includes: an electrode assembly; a nonaqueous electrolyte; and a battery case. The electrode assembly includes a positive electrode, a negative electrode, and a separator. The positive electrode includes a positive electrode active material layer. The negative electrode includes a negative electrode active material layer. The separator is interposed between the positive electrode and the negative electrode. The battery case accommodates the electrode assembly and the nonaqueous electrolyte. Ends of contact faces of the negative electrode active material layer and the separator are at least partially bonded to each other.

7 Claims, 5 Drawing Sheets

(56) References Cited

FOREIGN PATENT DOCUMENTS

| JP | 2015-219971 A | 12/2015 |
|----|---------------|---------|
| WO | 2014/001899 A1 | 1/2014 |
| WO | 2015/173623 A1 | 11/2015 |

\* cited by examiner

NONAQUEOUS ELECTROLYTE SECONDARY BATTERY AND MANUFACTURING METHOD THEREFOR

CROSS REFERENCE TO RELATED APPLICATIONS

This application is a Divisional of U.S. application Ser. No. 15/518,352 filed Apr. 11, 2017, which is a National Stage of International Application No. PCT/IB2015/001910 filed Oct. 16, 2015, claiming priority based on Japanese Patent Application No. 2014-212860 filed Oct. 17, 2014, the contents of all of which are incorporated herein by reference in their entirety.

BACKGROUND OF THE INVENTION

1. Field of the Invention

The invention relates to a nonaqueous electrolyte secondary battery in which occurrence of a micro short circuit due to foreign metal substances is reduced, and a manufacturing method for the nonaqueous electrolyte secondary battery.

2. Description of Related Art

A nonaqueous electrolyte secondary battery, typically, a lithium secondary battery, has a smaller size, a lighter weight, a higher energy density and a more excellent power density than an existing battery. For this reason, in recent years, the nonaqueous electrolyte secondary battery is suitably used as a so-called portable power supply for a personal computer, a mobile terminal, or the like, or a power supply for propelling a vehicle.

The nonaqueous electrolyte secondary battery is typically constructed by accommodating an electrode assembly in a battery case in a hermetically sealed state. The electrode assembly has such a structure that a positive electrode and a negative electrode are opposed to each other via a separator. Initial charging is applied to the constructed battery in a predetermined condition in order to adjust the battery to an actually usable state. Aging, or the like, is also applied to the battery after initial charging mainly for the purpose of checking for stabilization of a battery reaction, a short circuit, or the like.

Incidentally, in manufacturing a nonaqueous electrolyte secondary battery, for example, there is a case where foreign metal substances are included in a battery case as impurities (inclusion) of a constituent member or inevitable metal fine particles, and the like, that are developed at the time of constructing the battery. The included foreign metal substances can be ionized in an environment that exceeds a dissolved potential as a result of charging, and then dissolved into an electrolyte. The ionized foreign metal substances migrate toward the negative electrode during charging, and locally precipitate on the opposing negative electrode. Therefore, there is a concern that the precipitate reaches the positive electrode through the separator depending on the size, and the like, of foreign metal substances and then causes a micro internal short circuit to occur in the battery. If an internal short circuit occurs, there can be an inconvenience, such as deterioration of battery quality (for example, a decrease in energy density or safety).

SUMMARY OF THE INVENTION

The included foreign metal substances are promptly dissolved through the aging and caused to precipitate on the negative electrode to be short-circuited. Thus, such a battery in which foreign metal substances are included is detected (for example, self-discharge test) before shipment. However, there is a possibility that foreign metal substances not dissolved through the aging are gradually dissolved during usage of the battery after shipment and cause a micro short circuit to occur with a delay. The invention provides a nonaqueous electrolyte secondary battery in which occurrence of a micro short circuit is suppressed by suppressing inclusion of foreign metal substances into a portion that is hard to be dissolved through aging. The invention also provides a method of simply manufacturing such a nonaqueous electrolyte secondary battery.

In aging for the purpose of dissolving foreign metal substances, the positive electrode potential is increased by adjusting the battery potential, thus dissolving the foreign metal substances around the positive electrode. According to the detailed study of the inventors, mostly, dissolution of foreign metal substances included between the positive electrode (more specifically, the positive electrode active material, the positive electrode active material layer) and the separator is easy to proceed when the foreign metal substances are exposed to the positive electrode potential. However, it is found that dissolution of foreign metal substances included between the separator and the negative electrode (more specifically, the negative electrode active material) is difficult to proceed because the foreign metal substances are not exposed to a potential as high as the potential of the positive electrode. The foreign metal substances at such a portion gradually dissolve during later usage of the battery and can cause a micro short circuit during usage. For example, even when foreign metal substances have the same size and composition, the foreign metal substances cause a micro short circuit to occur with a delay (hereinafter, such a phenomenon may be referred to as "delayed micro short circuit") in comparison with the case where foreign metal substances are included between the positive electrode and the separator. In the technique described here, the inventors conceived that inclusion of foreign metal substances between the separator and the negative electrode is suppressed. The inventors found that inclusion of foreign metal substances into the electrode assembly easily occurs mainly at the time of impregnating the nonaqueous electrolyte, and completed the invention of the present application.

That is, a first aspect of the invention provides a nonaqueous electrolyte secondary battery. The nonaqueous electrolyte secondary battery includes: an electrode assembly; a nonaqueous electrolyte; and a battery case. The electrode assembly includes a positive electrode, a negative electrode, and a separator. The positive electrode includes a positive electrode active material layer. The negative electrode includes a negative electrode active material layer. The separator is interposed between the positive electrode and the negative electrode. The battery case accommodates the electrode assembly and the nonaqueous electrolyte. Ends of contact faces of the negative electrode active material layer and the separator are at least partially bonded to each other. With this configuration, a gap is difficult to be formed between the negative electrode active material layer and the separator at the time of impregnating the electrode assembly with the nonaqueous electrolyte. Therefore, inclusion of the foreign metal substances that become a cause of a delayed micro short circuit can be suitably suppressed, so it is desirable. Japanese Patent Application Publication No. 2003-151638 (JP 2003-151638 A) describes a lithium ion secondary battery in which one of a positive electrode and a negative electrode is bonded to a separator by an adhesive resin layer. The lithium ion secondary battery can be clearly distinguished from the nonaqueous electrolyte secondary battery described here in terms of the fact that the positive electrode or the negative electrode is bonded to the separator via the adhesive resin layer.

In the above aspect, the electrode assembly may be a flat rolled electrode assembly that is formed by stacking the long positive electrode, the long negative electrode and the long separator and then rolling the stacked positive electrode, negative electrode and separator into an oval shape in cross section with a rolling axis set to a width direction perpendicular to a longitudinal direction of the long positive electrode, the long negative electrode and the long separator. The negative electrode active material layer and the separator may be bonded to each other at a flat portion of an electrode face of the flat rolled electrode assembly (hereinafter, which may be simply referred to as plane portion) in a band-shaped region along each of ends in the width direction. A micro short circuit due to the foreign metal substances more easily occurs at the plane portion than a curved portion of the electrode face of the flat rolled electrode assembly (hereinafter, which may be simply referred to as rolling curved portion). Therefore, by suppressing inclusion of foreign metal substances into the plane portion of the flat rolled electrode assembly, a delayed micro short circuit is effectively suppressed, so it is desirable.

In the above aspect, the entire contact faces of the negative electrode active material layer and the separator may be bonded to each other. With this configuration, inclusion of foreign metal substances between the negative electrode active material layer and the separator is reliably suppressed, so it is desirable.

In the above aspect, the positive electrode active material layer and the separator may not be bonded to each other. When the positive electrode active material layer and the separator are bonded to each other in a state where the negative electrode active material layer and the separator are bonded to each other, there is a possibility that the flexural rigidity of the electrode assembly becomes excessively high, so it is undesirable.

In the above aspect, the negative electrode active material layer and the separator may be bonded to each other such that a peeling strength becomes larger than or equal to 0.2 N/m and smaller than or equal to 1.2 N/m. Thus, the negative electrode active material layer and the separator are bonded to each other in an appropriate bonded state.

A second aspect of the invention provides a manufacturing method for a nonaqueous electrolyte secondary battery. The manufacturing method includes: constructing a cell by accommodating an electrode assembly in a battery case, the electrode assembly including a positive electrode, a negative electrode and a separator, the positive electrode including a positive electrode active material layer, the negative electrode including a negative electrode active material layer, the separator being interposed between the positive electrode and the negative electrode; supplying a nonaqueous electrolyte into the battery case; and at least partially bonding ends of contact faces of the negative electrode active material layer and the separator to each other in advance of supplying the nonaqueous electrolyte. Thus, foreign metal substances are difficult to be included between the negative electrode active material layer and the separator at the time of impregnating the electrode assembly with the nonaqueous electrolyte, so it is possible to manufacture a battery in which a delayed micro short circuit is difficult to occur.

In the above aspect, the negative electrode active material layer may include a negative electrode active material and a binder. The negative electrode and the separator may be bonded to each other by, at the time of constructing the cell, bringing the negative electrode active material layer of the negative electrode and the separator into contact with each other and then heating while at least partially pressing the ends of the contact faces. Thus, the negative electrode active material layer and the separator are reliably bonded to each other.

In the above aspect, the negative electrode active material layer may include a negative electrode active material and a binder. The manufacturing method may further include drying the cell after constructing the cell. The negative electrode and the separator may be bonded to each other by, in drying the cell, heating while applying a pressure such that the ends of the contact faces of the negative electrode active material layer and the separator in the electrode assembly are at least partially pressed from an outside of the battery case. With this configuration, by utilizing the cell drying step, the negative electrode active material layer and the separator are bonded to each other, so it is desirable.

In the above aspect, the negative electrode and the separator may be bonded to each other by applying a pressure higher than or equal to 0.01 MPa and lower than or equal to 1 MPa between the negative electrode active material layer and the separator in a temperature range higher than or equal to a softening point of the binder and lower than or equal to 125° C. Thus, the negative electrode active material layer and the separator are reliably bonded to each other, so it is desirable.

In the above aspect, the negative electrode and the separator may be bonded to each other such that a peeling strength becomes larger than or equal to 0.2 N/m and smaller than or equal to 1.2 N/m. Thus, the negative electrode active material layer and the separator are effectively bonded to each other, so it is desirable.

In the above aspect, the manufacturing method may further include applying aging. By applying aging to the above-configured electrode assembly, dissolution and precipitation of foreign metal substances included between the positive electrode active material layer and the separator are promptly carried out. By extension, it is possible to prevent a battery in which a micro short circuit due to foreign metal substances can occur from being supplied to the market.

As described above, the nonaqueous electrolyte secondary battery according to the first aspect of the invention and the manufacturing method for a nonaqueous electrolyte secondary battery according to the second aspect of the invention can be the ones in which a delayed micro short circuit is suppressed by suitably suppressing inclusion of foreign metal substances into the electrode assembly. Therefore, for example, foreign metal substances are further reliably dissolved through ordinary aging, so it is possible to highly accurately determine through a self-discharge test whether a non-defective product or a defective product. That is, it is possible to provide the market with a high-quality and highly reliable secondary battery in which occurrence of a micro short circuit due to foreign metal substances is suppressed. The above secondary battery is easily manufactured only by adding additional operation to existing manufacturing steps, so the secondary battery can be provided at low cost. Therefore, such a secondary battery is usable in various applications, and is suitably used as a driving power supply mounted on a vehicle, such as a vehicle, which requires high safety and reliability. The secondary battery may be used solely (single cell) or may be used in a mode of a battery pack in which a plurality of the secondary batteries are connected in series with or parallel with each other.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

In the specification, a nonaqueous electrolyte secondary battery is a term that includes not only a so-called chemical battery, such as a lithium secondary battery, a nickel-metal hydride battery, a nickel cadmium battery and a lead storage battery, but also a storage element (for example, a pseudo-capacitance capacitor, a redox capacitor) that can be used similarly in a similar industrial field to a chemical battery (for example, a lithium secondary battery), a hybrid capacitor that is a combination of the chemical battery and the storage element, a lithium ion capacitor, and the like. The lithium secondary battery means a secondary battery that utilizes lithium ions as electrolytic ions and that is charged or discharged as a result of migration of lithium ions (migration of charges) between a positive electrode and a negative electrode. Generally, secondary batteries called a lithium ion battery, a lithium polymer battery, and the like, are typical examples included in the lithium secondary battery in the specification. In the specification, an active material means a substance (chemical compound) that is able to reciprocally occlude or release chemical species (lithium ions in the lithium secondary battery) that serves as an charge carriers at the positive electrode side or the negative electrode side.

In the technique described here, foreign metal substances that can be a dissolving target are metal (typically, metal fine particles) that can be included into a battery case in a manufacturing process for a nonaqueous electrolyte secondary battery, have an oxidation-reduction potential within an operation voltage range of the secondary battery, and can be dissolved (ionized) at that potential. Such foreign metal substances can be, for example, included into the battery case inevitably as impurities of constituent raw materials of the secondary battery, dust particles in sputtering or processing at the time of welding, or the like. Metallic elements that constitute such foreign metal substances (and the oxidation-reduction potentials thereof) are typically, for example, iron (Fe; 2.6 V) and copper (Cu; 3.4 V), and the compositions of foreign metal substances are chemical elements of them, alloys of them, and the like. Particularly, iron is, for example, a main ingredient of a stainless steel that is frequently used as various manufacturing devices, constituent members, and the like, so iron is considered as an chemical element that is highly likely to be included in the manufacturing process. In the specification, a potential means a lithium reference potential (VvsLi/Li$^+$) unless otherwise specified.

Hereinafter, the nonaqueous electrolyte secondary battery will be described together with embodiments of a manufacturing method for the battery described here. In the specification, matters other than the matters particularly referred to and required to be implemented (the general configuration, and the like, of the nonaqueous electrolyte secondary battery, which do not characterize the invention) can be understood as a design matter of persons skilled in the art based on the existing art in that field. The thus structured secondary battery may be implemented on the basis of information described in the specification and a technical common sense in the field. Hereinafter, a lithium secondary battery that is a desired mode will be described as an example; however, a target to which the invention is applied is not intended to be limited to the battery.

Figure 1:
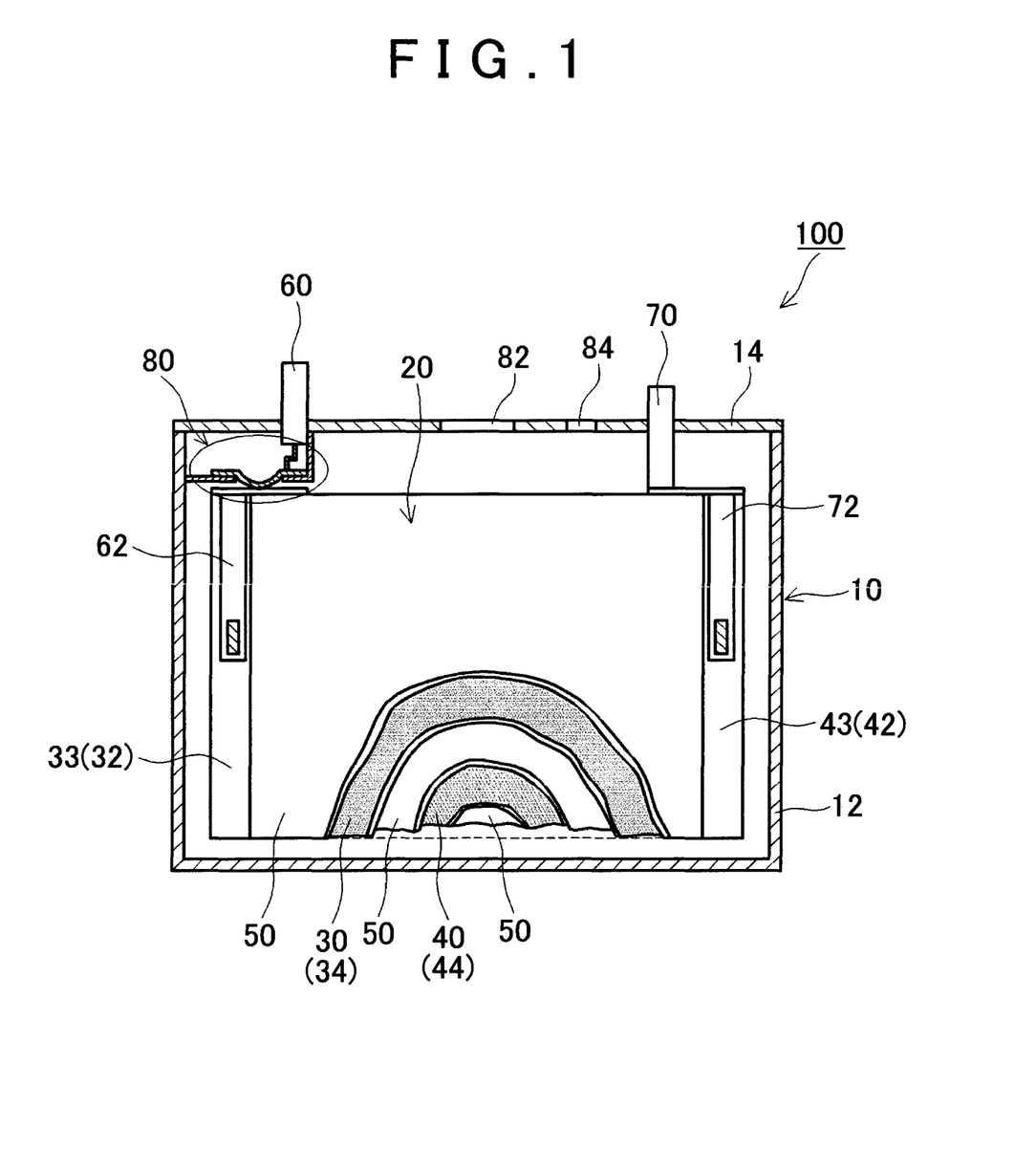
FIG. 1 is a cross-sectional view that schematically shows the configuration of a nonaqueous electrolyte secondary battery according to an embodiment of the invention.
Figure 2:
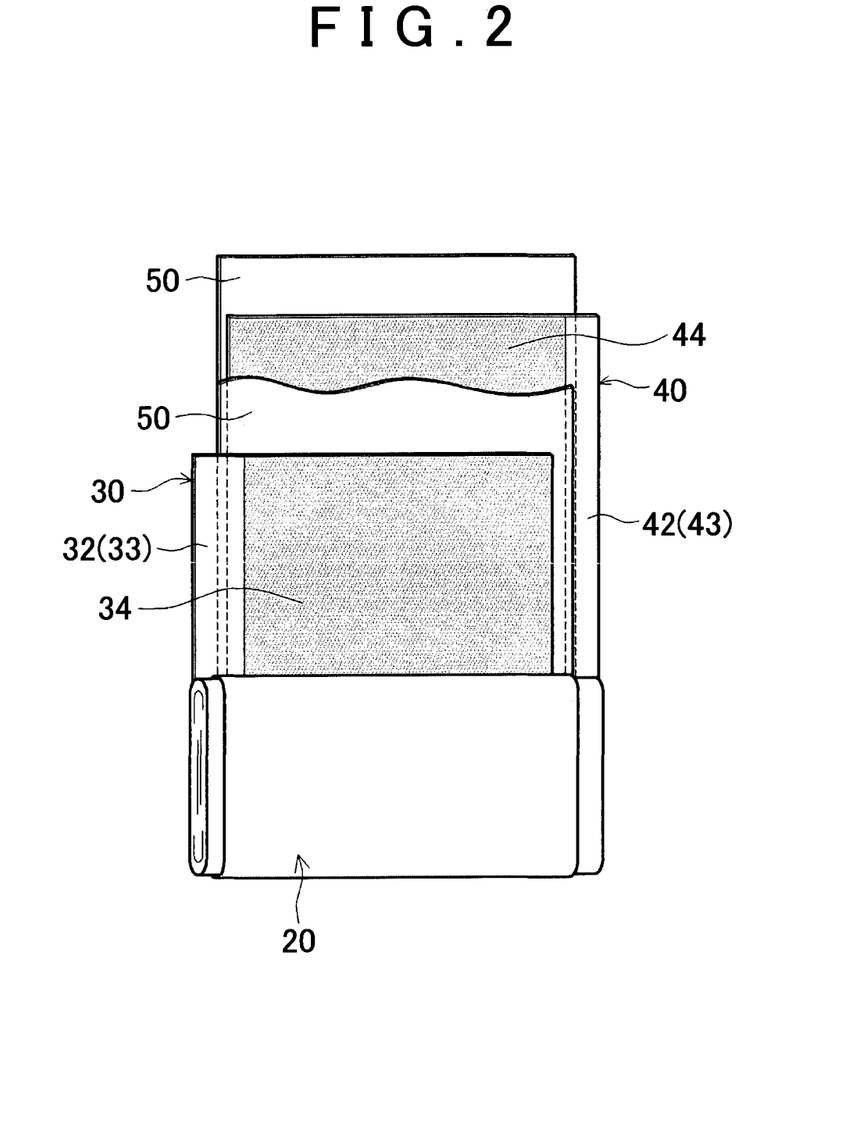
FIG. 2 is a schematic view that illustrates the configuration of a flat rolled electrode assembly according to the embodiment of the invention.
Figure 3A:
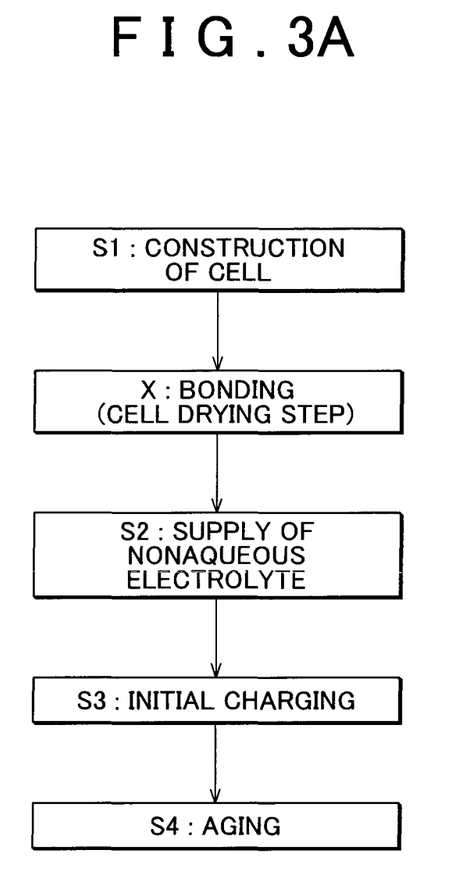
FIG. 3A is a flowchart of a manufacturing method for a nonaqueous electrolyte secondary battery according to an embodiment of the invention.
Figure 3B:
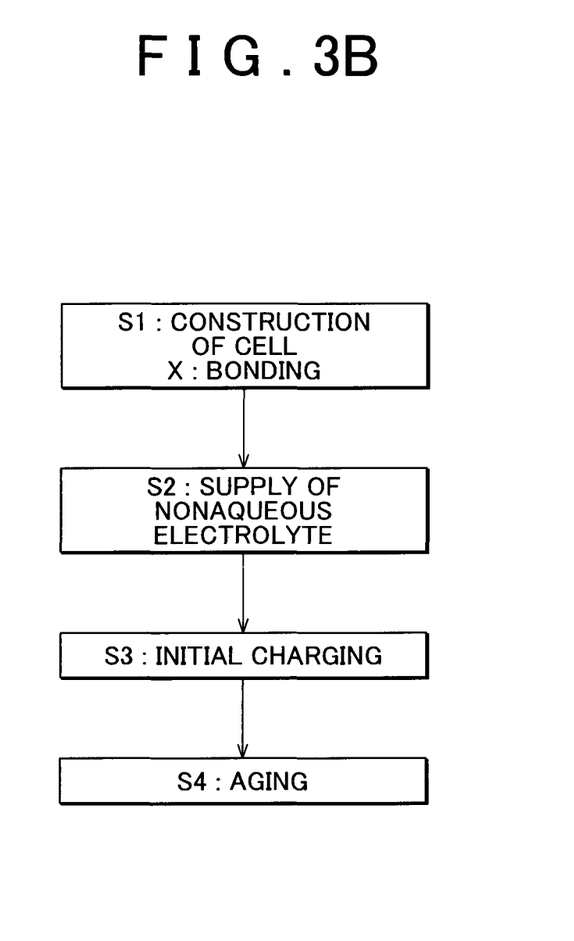
FIG. 3B is a flowchart of a manufacturing method for a nonaqueous electrolyte secondary battery according to another embodiment of the invention.

FIG. 1 is a schematic cross-sectional view of the nonaqueous electrolyte secondary battery according to the embodiment. FIG. 2 is a schematic view that illustrate the configuration of an electrode assembly that is provided in the nonaqueous electrolyte secondary battery. FIG. 3A and FIG. 3B are flowcharts that show manufacturing methods for the nonaqueous electrolyte secondary battery described here. Hereinafter, the scale ratios (length, width, thickness, and the like) in the drawings do not always reflect actual scale ratios. The nonaqueous electrolyte secondary battery 100 described here essentially includes an electrode assembly 20, a nonaqueous electrolyte (not shown), and a battery case 10. The electrode assembly 20 includes a positive electrode 30, a negative electrode 40, and a separator 50. The positive electrode 30 includes a positive electrode active material layer 34. The negative electrode 40 includes a negative electrode active material layer 44. The separator 50 is interposed between these positive electrode 30 and negative electrode 40. The electrode assembly 20 and the nonaqueous electrolyte are accommodated in the battery case 10. Initial charging is applied to the thus constructed secondary battery 100 in a predetermined condition in order to adjust the secondary battery 100 to an actually usable (shippable) state. For example, high-temperature aging for the main purpose of stabilizing a battery reaction, a self-discharge test (low-temperature aging) for checking for a micro short circuit, or the like, can be applied to the battery after initial charging. Only the battery that has passed the test is shipped as a product.

Incidentally, at the time of constructing the cell 100, foreign metal substances can be included in the electrode assembly 20. In such a case, when the potential of the positive electrode 30 becomes higher than the dissolved potential (oxidation potential) of foreign metal substances as a result of initial charging or charging for aging, foreign metal substances near the positive electrode 30 are oxidized (lose electrons) to become metallic ions, and dissolve into the electrolyte. For example, when the foreign metal substances are copper or iron, copper dissolves like $Cu \rightarrow Cu^{2+}$, or iron dissolves like $Fe \rightarrow Fe^{2\pm}$. The metallic ions are positively charged, so the metallic ions ordinarily linearly migrate toward the negative electrode 40 through the separator 50 between the positive and negative electrodes. The metallic ions are reduced at a position facing the foreign metal substances on the negative electrode 40, and locally (intensively) precipitate. Therefore, with the progress of charging, a precipitate on the negative electrode gradually grows toward the positive electrode 30. When the precipitate reaches the positive electrode, a short circuit (micro short circuit) occurs in the battery.

When foreign metal substances are not subjected to the potential of the positive electrode 30, specifically, for example, when foreign metal substances are present between the negative electrode 40 and the separator 50, the potential at the position at which the foreign metal substances are present is hard to reach the dissolved potential, so the foreign metal substances are hard to be dissolved. However, for example, depending on the mode of usage of the battery, dissolution of foreign metal substances can gradually proceed because of, for example, the fact that the potential of the foreign metal substances intermittently reaches the dissolved potential as a result of local overcharging, or the like. For example, in a battery in a usage mode in which a large capacity is charged or discharged at a high rate, an overcharged state easily occurs. During usage of the battery, there can occur a situation that a short circuit occurs with a delay. In order to avoid such a situation, the nonaqueous electrolyte secondary battery 100 described here employs such a configuration that foreign metal substances are not included between the negative electrode 40 and the separator 50.

In the technique described here, for example, specifically, as shown in FIG. 3A, the nonaqueous electrolyte secondary battery is manufactured in the following procedure.

(S1) Cell Construction Step
(S2) Nonaqueous Electrolyte Supply Step

In advance of the nonaqueous electrolyte supply step (S2), (X) a bonding step of at least partially bonding the ends of contact faces of the negative electrode active material layer and the separator to each other is included as a characteristic.

S1. Construction of Cell

In step S1, initially, the electrode assembly including the positive electrode 30, the negative electrode 40 and the separator 50 is prepared. The positive electrode 30 includes the positive electrode active material layer 34. The negative electrode 40 includes the negative electrode active material layer 44. The separator 50 is interposed between the positive electrode 30 and the negative electrode 40.

Positive Electrode

The positive electrode 30 typically includes a long positive electrode current collector 32 and the positive electrode active material layer 34. The positive electrode active material layer 34 is held on the positive electrode current collector 32. The positive electrode current collector 32 typically includes a portion, at which the positive electrode active material layer 34 is formed, and a positive electrode current collector exposed portion 33. At the positive electrode current collector exposed portion 33, no positive electrode active material layer 34 is provided and the current collector 32 is exposed. The positive electrode current collector exposed portion 33 is typically provided in a band shape along one end of the long positive electrode current collector 32 in the width direction. The positive electrode active material layer 34 is provided on the surface of the positive electrode current collector 32 other than the positive electrode current collector exposed portion 33. The positive electrode active material layer 34 may be provided on both faces of the positive electrode current collector 32 or may be provided only on any one of the faces. The positive electrode current collector 32 is suitably an electrically conductive member made of a metal having a high electrical conductivity (for example, aluminum, nickel, or the like). The positive electrode active material layer 34 at least includes a positive electrode active material, and has a porous structure so that impregnation of a nonaqueous electrolyte is possible.

A method of preparing the positive electrode 30 is not specifically limited. For example, a composition in form of paste (including slurry and ink) (hereinafter, referred to as "positive electrode paste) is prepared by mixing a positive electrode active material, an electrically conductive material, a binder, and the like, in an adequate solvent (for example, NMP), and the resultant paste is supplied onto the positive electrode current collector 32. Thus, the positive electrode active material layer 34 is formed. A method of supplying the positive electrode paste is, for example, a method of applying the positive electrode paste to one face or both faces of the positive electrode current collector with the use of an existing known coating applicator (for example, a slit coater, a die coater, a comma coater, a gravure coater). Alternatively, a positive electrode active material, an electrically conductive material and a binder are granulated into an adequate size to form granules, and the granules are supplied and pressure-bonded onto the positive electrode current collector 32. Thus, the positive electrode active material layer 34 is formed.

The positive electrode active material may be a material that is able to occlude or release lithium ions, and suitably a lithium-containing compound (for example, lithium transition metal composite oxide) including lithium element and one or two or more kinds of transition metal elements. For example, a lithium transition metal oxide having a bedded salt or spinel crystal structure is a suitable example. The lithium transition metal oxide can be, for example, a lithium-nickel composite oxide (for example, $LiNiO_2$), a lithium-cobalt composite oxide (for example, $LiCoO_2$), a lithium-manganese composite oxide (for example, $LiMn_2O_4$), or a ternary system lithium-containing composite oxide, such as a lithium-nickel-cobalt-manganese composite oxide (for example, $LiNi_{1/3}Co_{1/3}Mn_{1/3}O_2$). A polyanionic compound (for example, $LiFePO_4$, $LiMnPO_4$, $LiFeVO_4$, $LiMnVO_4$, $Li_2FeSiO_4$, $Li_2MnSiO_4$, $Li_2CoSiO_4$) expressed by the general formula $LiMPO_4$ or $LiMVO_4$ or $Li_2MSiO_4$ (M in the formula is at least one or more chemical elements selected from among Co, Ni, Mn, and Fe), or the like, may be used as the positive electrode active material.

The positive electrode active material layer 34 can contain one or two or more kinds of materials that can be used as the constituent components of the positive electrode active material layer in a general nonaqueous electrolyte secondary battery as needed in addition to the positive electrode active material. An example of such a material includes an electrically conductive material and a binder. The electrically conductive material may be, for example, suitably a carbon material, such as various carbon blacks (for example, acetylene black or Ketjen black), activated carbon, graphite, and carbon fiber. The binder may be, for example, suitably a vinyl halide resin, such as polyvinylidene fluoride (PVdF), and a polyalkylene oxide, such as a polyethylene oxide (PEO).

The proportion of the positive electrode active material in the entire positive electrode active material layer 34 is adequately higher than or equal to about 60 percent by mass (typically, 60 percent by mass to 95 percent by mass) from the viewpoint of achieving a high energy density, and is ordinarily suitably about 70 percent by mass to 95 percent by mass. When the binder is used, the proportion of the binder in the entire positive electrode active material layer may be, for example, about 0.5 percent by mass to 10 percent by mass from the viewpoint of suitably ensuring a mechanical strength (shape retainability), and is ordinarily suitably about 1 percent by mass to 5 percent by mass. When the electrically conductive material is used, the proportion of the electrically conductive material in the entire positive electrode active material layer may be, for example, about 1 percent by mass to 20 percent by mass from the viewpoint of achieving both output characteristics and energy density at high level, and is ordinarily suitably about 2 percent by mass to 10 percent by mass.

The mass per unit area (weight per unit area) of the positive electrode active material layer 34 that is provided on the positive electrode current collector 32 just needs to be larger than or equal to 3 mg/cm$^2$ (for example, larger than or equal to 5 mg/cm$^2$, typically, larger than or equal to 7 mg/cm$^2$) per one-side face of the positive electrode current collector 32 from the viewpoint of achieving a high energy density. From the viewpoint of achieving excellent output characteristics, the weight per unit area of the positive electrode active material layer 34 just needs to be smaller than or equal to 100 mg/cm$^2$ (for example, smaller than or equal to 70 mg/cm$^2$, typically, smaller than or equal to 50 mg/cm$^2$) per one-side face of the positive electrode current collector 32. The average thickness of the positive electrode active material layer 34 per one-side face just needs to be, for example, larger than or equal to 20 μm (typically, larger than or equal to 40 μm) and smaller than or equal to 100 μm (typically, smaller than or equal to 80 μm). The density of the positive electrode active material layer 34 just needs to be, for example, larger than or equal to 1.0 g/cm$^3$ (typically, larger than or equal to 2.0 g/cm$^3$) and smaller than or equal to 4.5 g/cm$^3$ (for example, smaller than or equal to 4.0 g/cm$^3$).

Negative Electrode

The long negative electrode 40 typically includes a long negative electrode current collector 42 and the negative electrode active material layer 44. The negative electrode active material layer 44 is formed on the negative electrode current collector 42. The negative electrode current collector 42 includes a portion, at which the negative electrode active material layer 44 is formed, and a negative electrode current collector exposed portion 43. At the negative electrode current collector exposed portion 43, no negative electrode active material layer 44 is provided and the current collector 42 is exposed. The negative electrode current collector exposed portion 43 is typically provided in a band shape along one end of the negative electrode current collector 42 in the width direction. The negative electrode active material layer 44 is provided on the surface of the negative electrode current collector 42 other than the negative electrode current collector exposed portion 43. The negative electrode current collector 42 is suitably an electrically conductive member made of a metal having a high electrical conductivity (for example, copper, nickel, or the like). The negative electrode active material layer 44 at least includes a negative electrode active material, and has such a porous structure that impregnation of a nonaqueous electrolyte is possible.

A method of preparing the negative electrode is not specifically limited. For example, a composition in form of paste (hereinafter, referred to as "negative electrode paste") is prepared by mixing a negative electrode active material, a binder, and the like, in an adequate solvent, and the resultant paste is applied onto the negative electrode current collector to form the negative electrode active material layer. The thus prepared negative electrode may be used. Alternatively, the negative electrode active material and an electrically conductive material described below and a binder as needed are granulated into an adequate size to form granules, and the granules are supplied and pressure-bonded onto the negative electrode current collector 42. Thus, the negative electrode active material layer 44 is formed. A similar method to the case of the above-described positive electrode may be employed as needed as a method of forming the negative electrode active material layer 44.

The negative electrode active material may be one or two or more kinds of known various materials that can be used as the negative electrode active material of the nonaqueous electrolyte secondary battery. A suitable example of the negative electrode active material includes a carbon material, such as graphite, non-graphitizable carbon (hard carbon), graphitizable carbon (soft carbon), carbon nanotube, and a material having a structure that combines any two or more of them. Among others, from the viewpoint of energy density, a graphite material, such as natural graphite (black lead) and artificial graphite, may be suitably used. The graphite material may be suitably a material in which amorphous carbon is arranged on at least part of the surface. More suitably, almost the entire surface of granular carbon is coated with an amorphous carbon film. Many edge surfaces are exposed on the surface of amorphous carbon, so the acceptability of charge carriers is high (that is, the speed of occlusion/release of charge carriers is high). Graphite has a large theoretical capacity, and has an excellent energy density. Therefore, by using amorphous carbon-coated graphite as the negative electrode active material, it is possible to achieve the nonaqueous electrolyte secondary battery that has a high capacity, a high energy density and excellent input/output characteristics. Other than such carbon materials, for example, a lithium-titanium composite oxide, such as $Li_4Ti_5O_{12}$, or a lithium transition metal composite compound, such as a lithium transition metal composite nitride, may be used.

The negative electrode active material layer 44 can contain one or two or more materials that can be used as the constituent components of the negative electrode active material layer 44 in a general nonaqueous electrolyte secondary battery as needed in addition to the negative electrode active material. Examples of such materials include a binder and various additives. A binder similar to the binder that is used in the negative electrode of a general lithium ion secondary battery may be employed as the binder as needed. For example, a binder similar to that in the positive electrode 30 may be used. As a suitable mode, when the aqueous solvent is used to form the negative electrode active material layer 44, a rubber, such as styrene-butadiene rubber (SBR), a water-soluble polymer material, such a polyethylene oxide (PEO) and a vinyl acetate copolymer, or a water-dispersible polymer material can be suitably employed. Other than the above, various additives, such as a thickener, a dispersant and an electrically conductive material, may be used as needed. For example, the thickener includes carboxymethyl cellulose (CMC), methyl cellulose (MC), a cellulose-based polymer, such as cellulose acetate phthalate (CAP).

The proportion of the negative electrode active material in the entire negative electrode active material layer is adequately higher than or equal to about 50 percent by mass, and is ordinarily suitably 90 percent by mass to 99 percent by mass (for example, 95 percent by mass to 99 percent by mass). Thus, it is possible to achieve a high energy density. When the binder is used, the proportion of the binder in the entire negative electrode active material layer may be, for example, about 1 percent by mass to 10 percent by mass, and is ordinarily suitably about 1 percent by mass to 5 percent by mass. Thus, the mechanical strength (shape retainability) of the negative electrode active material layer is suitably ensured, and high durability is achieved. When the thickener is used, the proportion of the thickener in the entire negative electrode active material layer may be, for example, about 1 percent by mass to 10 percent by mass, and is ordinarily suitably about 1 percent by mass to 5 percent by mass.

The mass per unit area (weight per unit area) of the negative electrode active material layer 44 that is provided on the negative electrode current collector 42 just needs to be larger than or equal to 5 mg/cm$^2$ (typically, larger than or equal to 7 mg/cm$^2$) per one-side face of the negative electrode current collector 42 and smaller than or equal to about 20 mg/cm$^2$ (typically, 15 mg/cm$^2$) from the viewpoint of achieving a high energy density and a power density. The thickness of the negative electrode active material layer 44 per one-side face just needs to be, for example, larger than or equal to 40 μm (typically, larger than or equal to 50 μm) and smaller than or equal to 100 μm (typically, smaller than or equal to 80 μm). The density of the negative electrode active material layer 44 just needs to be, for example, larger than or equal to 0.5 g/cm$^3$ (typically, larger than or equal to 1.0 g/cm$^3$) and smaller than or equal to 2.0 g/cm$^3$ (typically, 1.5 g/cm$^3$).

Separator

The separator 50 is a constituent material that electrically insulates the positive electrode 30 and the negative electrode 40 from each other, that holds charge carriers, and that allows passage of the charge carriers. The separator 50 may be suitably formed of a microporous resin sheet made of various materials. Although not specifically limited, the separator 50 may be configured to have a shutdown function of interrupting passage of charge carriers by softening and melting when the temperature of the flat rolled electrode assembly 20 becomes a predetermined temperature. For example, a microporous sheet made of a polyolefin resin, typically, polyethylene (PE) or polypropylene (PP), is suitable as the separator 50 because the microporous sheet is able to relatively suitably set a shutdown temperature (for example, softening temperature). For example, the shutdown temperature (softening temperature) of the separator 50 made of polyethylene may be set to 120° C. to 145° C., suitably 125° C. to 140° C., and may be, for example, set to 130° C. to 135° C.

In the separator 50, in order to suitably endure the oxidation atmosphere of the positive electrode, the microporous resin sheet is used as a base material, and the surface (one-side face) of the base material, facing the positive electrode 30, may be formed of an oxidation-resistant resin, such as polyamide and polyamide-imide, having a higher oxidation resistance than the polyolefin resin. Alternatively, the microporous resin sheet is used as a base material, and a heat-resistant layer (HRL) made of inorganic filler (inorganic aggregate) having a heat resistance property and an electrical insulation property may be provided on one-side face or both faces of the base material. Suitably, the HRL may be provided on the surface (one-side face) facing the positive electrode 30. For example, a fine powder having an average particle size larger than or equal to about 0.1 μm and smaller than or equal to 3 μm and made of alumina ($Al_2O_3$), zirconia ($ZrO_2$), ceria ($CeO_2$), yttria ($Y_2O_3$), boehmite ($Al_2O_3 \cdot H_2O$), mullite ($Al_6O_{13}Si_2$), magnesia (MgO), silica ($SiO_2$), titania ($TiO_2$), or the like, may be used as the inorganic filler.

Thus, for example, even when the temperature of the flat rolled electrode assembly 20 becomes higher than the melting point of the separator 50 and then the separator 50 shrinks or breaks, it is possible to prevent a short circuit between the positive electrode 30 and the negative electrode 40. By providing the inorganic filler on the surface facing the positive electrode 30, bonding of the negative electrode 40 (described later) with the separator 50 is suitably achieved. Although the average thickness of the entire separator 50 is not specifically limited, the average thickness may be ordinarily larger than or equal to 10 μm, typically, larger than or equal to 15 μm, and, for example, larger than or equal to 17 μm. The upper limit of the average thickness may be smaller than or equal to 40 μm, typically, smaller than or equal to 30 μm, and, for example, smaller than or equal to 25 μm. Because the average thickness falls within the above range, the high permeability of charge carriers is kept, and a micro short circuit (leakage current) becomes more difficult to occur. Therefore, both the input/output density and safety are achieved at high level.

Electrode Assembly

For example, the flat rolled electrode assembly 20 shown in FIG. 2 is formed by using the prepared positive electrode 30, negative electrode 40 and separator 50. That is, the long positive electrode 30, the long negative electrode 40 and the two long separators 50 are stacked such that one of the separators 50 is interposed between the long positive electrode 30 and the long negative electrode 40 and the other one of the long separators 50 is stacked on the long negative electrode 40 across the long negative electrode 40 from the one of the long separators 50, and then rolled into an oval shape in cross section with a rolling axis set to the width direction perpendicular to the longitudinal direction. The flat rolled electrode assembly 20 may be shaped by crushing and squashing the cylindrical rolled electrode assembly 20 laterally or may be formed by rolling the stacked long positive electrode 30, long negative electrode 40 and long separators 50 into a flat shape in cross section from the beginning. The shape of the flat rolled electrode assembly 20 may be appropriately adjusted commensurately with the shape of the battery case 10 to be used.

At the time of stacking the positive electrode 30, the negative electrode 40 and the separators 50, the positive electrode 30 and the negative electrode 40 just need to overlap each other with a slight offset in the width direction such that the positive electrode current collector exposed portion 33 of the positive electrode 30 and the negative electrode current collector exposed portion 43 of the negative electrode 40 respectively project from one end and the other end of the separators 50 in the width direction. As a result, in the rolling axis W direction of the flat rolled electrode assembly 20, the positive electrode current collector exposed portion 33 and the negative electrode current collector exposed portion 43 respectively extend outward from a rolling core portion (that is, a portion at which the positive and negative electrode active material layers 34, 44 face each other). By utilizing the positive electrode current collector exposed portion 33 and the negative electrode current collector exposed portion 43, current is collected at high efficiency.

Assembling of Cell

Next, the electrode assembly 20 is accommodated in the appropriate battery case 10. The secondary battery (cell) 100 is constructed by hermetically sealing the case 10. Although not specifically distinguished strictly, in the specification, the battery up to completion of treatment, such as initial charging and aging, in the state where the electrode assembly is accommodated in the battery case may be referred to as cell. A material and a shape that are conventionally used for a secondary battery may be used for the battery case 10.

For example, a relatively light metal material, such as aluminum and steel, or a resin material, such as polyphenylene sulfide resin and polyimide resin, may be used as the material of the battery case. Among others, from the viewpoint of, for example, improving heat radiation property and energy density, the battery case 10 made of a relatively light metal (for example, aluminum or an aluminum alloy) can be suitably employed. The shape of the case 10 (the outer shape of the casing) is also not specifically limited. For example, the shape of the case 10 can be a circular shape (a cylindrical shape, a coin shape, a button shape), a hexahedron shape (box shape), a shape deformed by processing any one of them, or the like.

The battery case 10 illustrated in this drawing includes a flat rectangular parallelepiped (box-shaped) case body 12 and a sealing lid 14. The upper end of the case body 12 is open. The sealing lid 14 closes the opening. A positive electrode terminal 60 and a negative electrode terminal 70 are provided at the upper face (that is, the sealing lid 14) of the battery case 10. The positive electrode terminal 60 is electrically connected to the positive electrode 30 of the flat rolled electrode assembly 20. The negative electrode terminal 70 is electrically connected to the negative electrode 40 of the electrode assembly 20. For example, a positive electrode current collecting plate 62 is connected to the exposed end of the positive electrode current collector 32 of the electrode assembly 20 by a welded portion, or the like, and a negative electrode current collecting plate 72 is connected to the exposed end of the negative electrode current collector 42 by a welded portion, or the like. The positive electrode current collecting plate 62 and the negative electrode current collecting plate 72 are respectively electrically connected to the positive electrode terminal 60 and the negative electrode terminal 70. In the battery case 10, a safety mechanism, such as a current interrupting mechanism 80 (a mechanism that can interrupt current in response to an increase in internal pressure at the time of overcharging of the battery) may be provided as needed in an electrically conductive path between the positive electrode terminal 60 and the electrode assembly 20 or an electrically conductive path between the negative electrode terminal 70 and the electrode assembly 20. The sealing lid 14, as well as the battery case 10 of an existing secondary battery, includes a safety valve 82, a filling port 84, and the like. The safety valve 82 is used to emit gas, generated inside the battery case, to the outside of the case. The filling port 84 is used to fill a nonaqueous electrolyte.

Sealing work may be carried out in a similar method to a method that is conventionally used for a secondary battery. For example, when the battery case 10 made of a metal is used, a technique, such as laser welding, resistance welding and electron beam welding, may be used. When the battery case 10 made of a nonmetal (for example, a resin material) is used, a technique, such as bonding using an adhesive agent and ultrasonic welding, may be used.

X. Bonding

It is presumable that inclusion of foreign metal substances between the negative electrode 40 and each of the separators 50 occurs at the time when a nonaqueous electrolyte is filled into the cell constructed as described above and then the nonaqueous electrolyte is impregnated between the negative electrode 40 and each separator 50 in the flat rolled electrode assembly 20. Thus, in the technique described here, in advance of supplying a nonaqueous electrolyte in the next step S2, this step X is carried out, and the ends of the contact faces of the negative electrode active material layer 44 and each of the separators 50 are at least partially bonded to each other.

X-1. Bonding in Drying Step

Depending on the application of the nonaqueous electrolyte secondary battery, a cell drying step can be included after the cell is constructed and before a nonaqueous electrolyte is supplied. In this cell drying step, in order to reduce moisture in the electrode assembly 20 (for example, a solvent contained in the positive electrode paste or the negative electrode paste, or the like) to a predetermined level or lower, typically, for example, the cell can be heated to about 105° C.±5° C. In the technique described here, as shown in FIG. 3A, by utilizing the cell drying step, the negative electrode 40 is bonded to each of the separators 50.

Specifically, the negative electrode 40 is bonded to each of the separators 50 by heating the cell while pressing the battery case 10 from the outside at the time of drying the cell. At this time, the ends of the contact faces of the negative electrode active material layer 44 and each separator 50 of the electrode assembly 20 are at least partially pressed via the battery case 10. Thus, the binder contained in the negative electrode active material layer 44 softens or melts at that portion, and adheres to each separator 50 at the pressed portion. In this state, when the binder is solidified by cooling the negative electrode active material layer 44 and each separator 50, the negative electrode active material layer 44 and each separator 50 are bonded to each other.

Figure 4A:
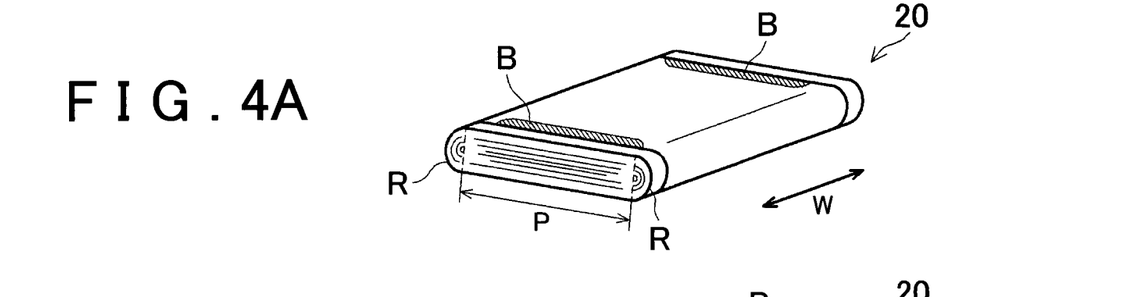
FIG. 4A to FIG. 4E are views that schematically illustrate portions at which a negative electrode and a separator are bonded to each other in the flat rolled electrode assembly.
Figure 4B:
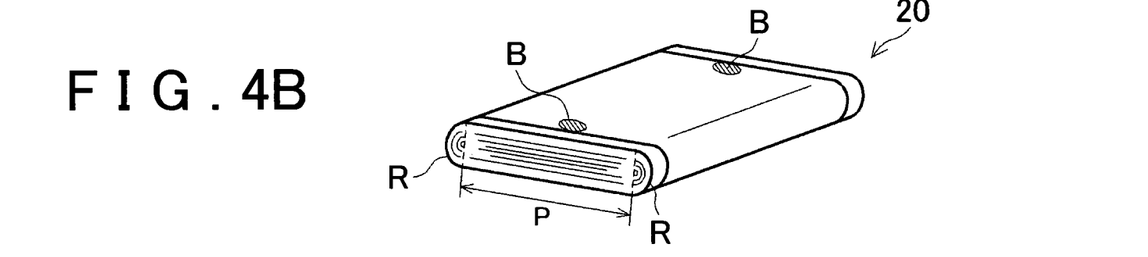
Figure 4C:
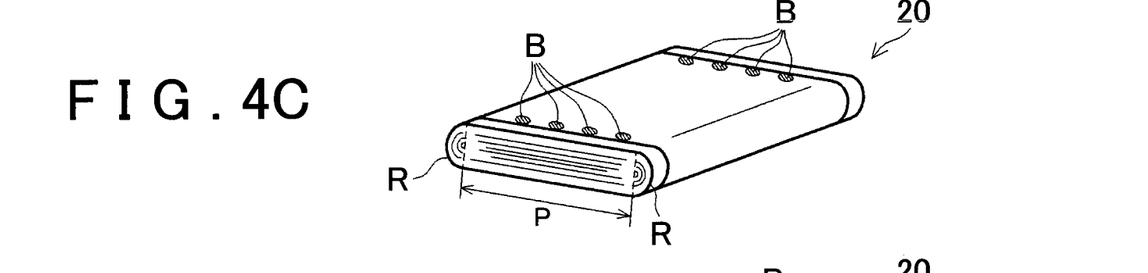
Figure 4D:
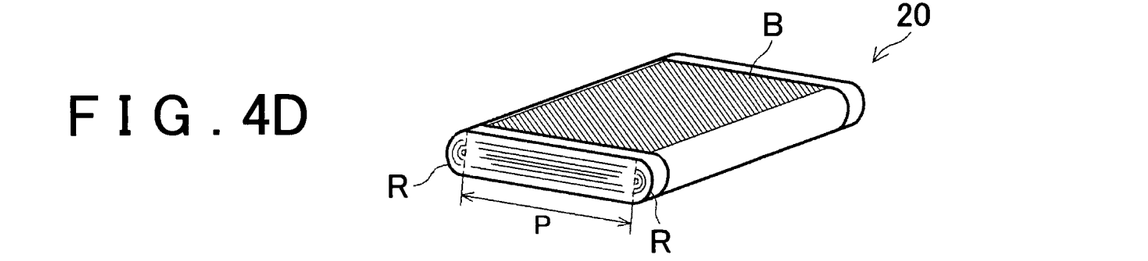

As long as the negative electrode active material layer 44 and each separator 50 are able to prevent insertion of foreign metal substances between these layers, a certain advantageous effect is obtained. From the above viewpoint, the negative electrode active material layer 44 and each separator 50 just need to be at least partially bonded to each other at a plane portion P of the flat rolled electrode assembly 20 in each of the band-shaped regions along both ends in the rolling axis W direction (width direction). Both ends in the rolling axis W direction become inlets between the layers of the flat rolled electrode assembly 20. For example, as shown in FIG. 4A, both ends of the plane portion P in the width direction may be suitably bonded respectively in the band-shaped regions B. However, the negative electrode active material layer 44 and each separator 50 do not need to be bonded all over each of the band-shaped regions. For example, as shown in FIG. 4B, the negative electrode active material layer 44 and each separator 50 may be bonded to each other in regions B, each of which is located near the center of the corresponding band-shaped region in the longitudinal direction. For example, as shown in FIG. 4C, bonding may be carried out in a plurality of regions B in each of the band-shaped regions. Alternatively, for example, as shown in FIG. 4D, bonding may be reliably carried out substantially over the entire region B of the plane portion P. For example, according to the mode shown in FIG. 4D, it is suitable in terms of making it possible to reliably prevent inclusion of foreign metal substances between the negative electrode active material layer 44 and each separator 50. In the examples shown in FIG. 4A to FIG. 4E, the bonding regions B at one end and the other end of the plane portion P in the width direction are provided at the same positions; however, bonding regions B at one end and the other end may be provided at different positions. In the specification, "partially", for example, means at a part of ends of contact faces of the negative electrode active material layer 44 and the separator 50.

The heating temperature in bonding may be set to a temperature higher than or equal to the softening point (for example, higher than or equal to 60° C.) of the binder contained in the negative electrode active material layer 44. More suitably, the heating temperature is suitably higher than or equal to the softening point of the binder and higher than or equal to 100° C., more suitably higher than or equal to 105° C., and particularly suitably higher than or equal to 110° C. Although the upper limit of the heating temperature is not specifically limited, for example, when the separator has a shutdown function, the heating temperature is suitably a temperature lower than or equal to the softening temperature (or lower than the softening temperature) of the separator. For example, the upper limit of the heating temperature may be lower than or equal to 125° C., suitably lower than or equal to 120° C. and particularly suitably lower than or equal to 115° C. For example, the upper limit of the heating temperature may be a temperature range up to about 105° C. at which moisture can be volatized at normal pressure.

Although not always required, bonding may be carried out in a reduced pressure in order to suitably dry or remove moisture in the battery case 10. The pressure in this case is suitably reduced to, for example, 3 kPa (abs) or higher and 18 kPa (abs) or lower, more suitably 5 kPa (abs) or higher and 15 kPa (abs) or lower, and particularly suitably 8 kPa (abs) or higher and 12 kPa (abs) or lower, in absolute pressure.

The pressure at the time of pressing is set so as to apply a pressure higher than or equal to 0.01 MPa and lower than or equal to 1 MPa between the negative electrode active material layer 44 and each separator 50. When the pressure higher than or equal to 0.01 MPa is applied, a bonding strength is achieved to such an extent that, for example, the negative electrode active material layer 44 and each separator 50 do not easily peel off from each other because of expansion or shrinkage of the negative electrode active material layer 44 resulting from charging or discharging. The pressure is suitably higher than or equal to 0.05 MPa and more suitably higher than or equal to 0.1 MPa. Although the upper limit of the pressure to be applied is not specifically limited, a bonding force to such an extent that it is possible to prevent inclusion of foreign metal substances between the negative electrode active material layer 44 and each separator 50 just needs to be provided in the invention described here. The upper limit of the pressure may be, for example, lower than or equal to 1 MPa, may be lower than or equal to 0.75 MPa, and may be, for example, lower than or equal to 0.7 MPa.

The local pressing from the outside of the battery case as shown in FIG. 4A to FIG. 4E may be, for example, suitably carried out by using a constrained plate (which can be a spacer) that is used at the time when a plurality of nonaqueous electrolyte secondary batteries are constrained. Specifically, in order to obtain the effect of facilitating aging, or the like, there is a case where a plurality of batteries are constrained by interposing a constrained plate between the plurality of batteries and then aging, or the like, is treated in this constrained state. By using the constrained plate, for example, it is possible to press the plane portion P of the flat rolled electrode assembly 20 inside the battery case by applying confined pressure uniformly to the plane portion P without reducing the strength of the battery case. For example, by providing desired protruded portions having shapes corresponding to the regions B on the face that the constrained plate contacts the battery case 10, it is possible to locally apply pressure to the regions B of the electrode assembly with the protruded portions. Thus, at selected positions at the ends of the plane portion P of the flat rolled electrode assembly 20 in the width direction, the negative electrode active material layer 44 and each separator 50 are bonded to each other.

In the specification, "bonding", for example, means the state where the negative electrode active material layer 44 and each separator 50 are bound to each other by physical or chemical binding force via a component (typically, a binder or a resin) having a binder ability intrinsically contained in the negative electrode active material layer 44 and/or each separator 50. For example, the case where the negative electrode active material layer 44 and each separator 50 are in contact with (adjacent to) each other via the binder component of the negative electrode active material layer 44 or the case where both are not bound to each other even when, for example, electrostatically adhere to each other is not included in bonding described here.

Whether sufficient bonding is achieved is, for example, determined by measuring the peeling strength between the negative electrode active material layer 44 and each separator 50 subjected to bonding in the same condition. The peeling strength between the negative electrode active material layer 44 and each separator 50 can be quantitatively evaluated by, for example, "90 degree peeling test" defined in JIS K6854-1: 1999. In one suitable mode, the 90 degree peeling strength between the negative electrode 40 and each separator 50 after bonding is suitably larger than or equal to 0.2 N/m, typically, larger than or equal to 0.3 N/m, and can be, for example, larger than or equal to 0.4 N/m. The upper limit of the peeling strength is not specifically limited. For example, it is determined to be sufficient as long as the upper limit of the peeling strength is smaller than or equal to about 2 N/m. Because bonding stronger than required can lead to breakage of an electrode, the peeling strength may be, for example, smaller than or equal to about 1.2 N/m, suitably smaller than or equal to 0.7 N/m, typically smaller than or equal to 0.6 N/m, and can be, for example, smaller than or equal to 0.5 N/m. Thus, the negative electrode active material layer 44 and each separator 50 are reliably bonded to each other, so it is possible to prevent inclusion of foreign metal substances.

The positive electrode 30 (positive electrode active material layer 34) and each separator 50 are not limited to this configuration. As in the case of an existing cell, even when the positive electrode 30 and each separator 50 contact each other, the positive electrode 30 and each separator 50 are suitably not bonded to each other. This is because, if the positive electrode 30 is bonded in addition to the negative electrode 40 (negative electrode active material layer 44) and each separator 50, there is a concern that the durability decreases because of a loss of the flexibility of the flat rolled electrode assembly 20 or suppressing impregnation of a nonaqueous electrolyte. At the surface of the negative electrode 40 (negative electrode active material layer 44), gas can be generated as a result of decomposition of the electrolyte or overcharged additive during ordinary battery use or during overcharging. When the positive electrode 30 and each separator 50 are bonded to each other, emission of gas generated in the negative electrode 40 to the outside of the electrode assembly 20 can be impaired, so it is not suitable. Although not always required, from such a viewpoint, each separator 50 more suitably has the HRL on the surface facing the positive electrode.

X-2. Bonding During Construction of Electrode Assembly

Figure 4E:
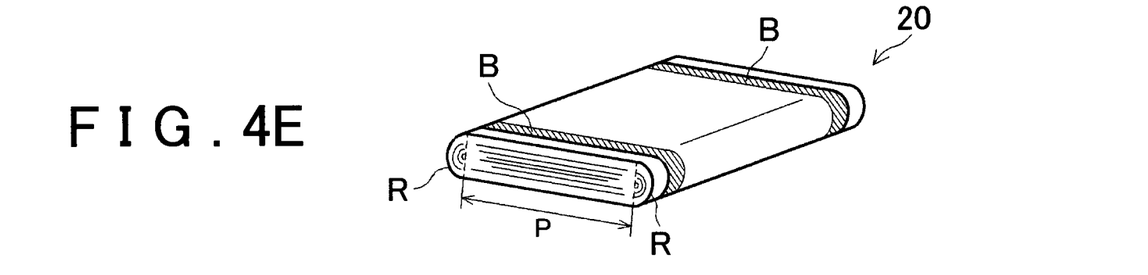

As another mode, the timing of bonding between the negative electrode 40 and each separator 50 is, for example, not limited to the timing after the cell construction step S1 and before the nonaqueous electrolyte supply step S2 as described above. For example, as shown in FIG. 3B, bonding may be carried out together when the flat rolled electrode assembly 20 is constructed. That is, for example, in constructing the flat rolled electrode assembly 20, the long negative electrode 40 is placed between the two separators 50 (or the one separator 50 having a double length and folded into two), the long positive electrode 30 is laid over them, and the stacked components are rolled in the longitudinal direction about the rolling axis W. For example, at this time, when the negative electrode 40 is placed between the separators 50 and the negative electrode active material layer 44 is brought into contact with the separators 50, both ends of the contact faces of the negative electrode active material layer 44 and each separator 50 in the width direction may be at least partially bonded to each other. The heating condition and pressing condition for bonding may be determined similarly to the case where the battery case 10 is pressed from the outside. For example, heating and pressing may be carried out by utilizing a flat press machine, a roll press machine, or the like. By utilizing an appropriate pressing jig, for example, the negative electrode active material layer 44 and each separator 50 are bonded to each other in the regions B as shown in FIG. 4A to FIG. 4D with the above configuration. For example, as shown in FIG. 4E, the negative electrode active material layer 44 and each separator 50 may be bonded to each other at not only the plane portion P of the flat rolled electrode assembly 20 but also a curved portion R of the flat rolled electrode assembly 20.

S2. Supply of Nonaqueous Electrolyte

Subsequently, in step S2, a nonaqueous electrolyte is supplied into the battery case 10. In the technique described here, in advance of the nonaqueous electrolyte supply step S2, the ends of the negative electrode 40 and each separator 50 are at least partially bonded to each other. Thus, at the time of supplying the nonaqueous electrolyte, inclusion of foreign metal substances, included in the battery case 10, between the negative electrode 40 and each separator 50 together with the nonaqueous electrolyte is suppressed. Thus, for example, it is possible to suppress the rate of occurrence of delayed fracture to a lower rate. The delayed fracture is that dissolution of foreign metal substances gradually proceeds after shipment of the battery and then a micro short circuit occurs.

Typically, a supporting electrolyte (for example, a lithium salt in a lithium ion secondary battery) dissolved or dispersed in a nonaqueous solvent can be employed as the nonaqueous electrolyte. Alternatively, a so-called solid electrolyte in which a polymer is added to a liquid nonaqueous electrolyte to form a gel may be employed as the nonaqueous electrolyte. Various organic solvents, such as carbonates, ethers, esters, nitriles, sulfones and lactones, that are used as an electrolyte in a general lithium ion secondary battery may be used as the nonaqueous solvent without any particular limitations. For example, specifically, the aqueous solvent includes ethylene carbonate (EC), propylene carbonate (PC), diethyl carbonate (DEC), dimethyl carbonate (DMC), ethylmethyl carbonate (EMC), and the like. One of such nonaqueous solvents may be used solely or two or more of such nonaqueous solvents may be used as a mixed solvent.

Various salts that are used in a general lithium ion secondary battery may be selected and employed as needed as the supporting electrolyte. For example, using a lithium salt, such as $LiPF_6$, $LiBF_4$, $ClO_4$, $LiAsF_6$, $Li(CF_3SO_2)_2N$ and $LiCF_3SO_3$, is illustrated. One of such supporting salts may be used solely or two or more of such supporting salts may be used in combination. The supporting salt is suitably prepared such that the concentration in the nonaqueous electrolyte falls within the range of 0.7 mol/L to 1.3 mol/L.

The nonaqueous electrolyte may include various additives, or the like, unless the nonaqueous electrolyte impairs the advantage of the lithium ion secondary battery described here. The additives include a film-forming agent, such as vinylene carbonate (VC) and fluoroethylene carbonate (FEC), a gas-forming agent, such as biphenyl (BP) and cyclohexylbenzene (CHB), and the like.

S3. Initial Charging

In the technique described here, although not an indispensable step, in preparing the nonaqueous electrolyte secondary battery 100, after the electrolyte supply step S2, initial charging may be suitably carried out. Initial charging is a step of charging the constructed secondary battery (cell) 100, for example, up to an operating upper limit voltage value of the battery in a normal temperature range. Typically, charging (typically, constant-current charging) just needs to be carried out up to a predetermined voltage by connecting an external power supply (not shown) between the positive electrode 30 (positive electrode terminal 60) of the cell and the negative electrode 40 (negative electrode terminal 70) of the cell. The normal temperature range in this initial charging step is typically a temperature range considered to be a normal temperature, and can be 20° C.±15° C. The voltage (typically, reachable maximum voltage) between the positive and negative electrode terminals in initial charging can vary depending on the types of active materials and nonaqueous solvent used, and the like; however, the voltage just needs to be a voltage range that can be indicated at the time when the state of charge (SOC) of the battery assembly is higher than or equal to about 80% (typically, 90% to 105%) of a full charge capacity (typically, the rated capacity of the battery). For example, in a battery that becomes a full charge state at 4.2 V, the battery is adjusted within the range of about 3.8 to 4.2 V. A charging rate in initial charging may be similar to an existing known charging rate that can be generally employed when an existing battery assembly is initially charged, and may be, for example, about 0.1 to 10 C. The charging may be carried out once or may be, for example, repeatedly carried out twice or more with discharging in between.

S4. Aging

An aging step is typically a step of holding (typically, left standing) the secondary battery (cell) 100, subjected to the initial charging step, in a predetermined temperature range at a predetermined SOC for a set time. The temperature at which the cell is held may be a low temperature range (for example, about the normal temperature range to 40° C.) or may be a high temperature range (for example, about 40° C. to 80° C.). The SOC of the cell may also be any one of the state from 0% to 100% or the state higher than or equal to 100%. These temperature and SOC may be variously changed in order to achieve a predetermined advantageous effect through aging.

In this aging, foreign metal substances included between the positive electrode 30 and each separator 50 can be exposed to a high positive electrode potential. Thus, electrons are exchanged between the positive electrode 30 and the foreign metal substances, and the foreign metal substances are dissolved (that is, ionized). The ions of the dissolved foreign metal substances are positively charged, so the ions are attracted toward the negative electrode 40 having a lower potential in the electrolyte. When there is a portion at which the potential becomes lower than or equal to the reduction potential of the foreign metal substances on the surface of the negative electrode 40, the ions of the foreign metal substances can precipitate at that portion as a precipitate. When the aging completes and the potential of the negative electrode becomes lower than or equal to the reduction potential of the foreign metal substances, the ions of the foreign metal substances precipitate as a precipitate on the surface of the negative electrode 40. The battery 100 in which a micro short circuit has occurred because of such precipitation of metal may be, for example, determined and collected through a self-discharge test step described below.

In the manufacturing method described here, foreign metal substances included between the positive electrode 30 and each separator 50 can be promptly dissolved because of the high potential of the positive electrode. Therefore, for example, even when foreign metal substances are iron having a low dissolution rate, the foreign metal substances are suitably dissolved in a relatively short time. Inclusion of foreign metal substances between the negative electrode 40 and each separator 50 is prevented. Therefore, for example, inclusion of iron, or the like, having a low dissolution rate between each separator 50 and the negative electrode 40 where dissolution is hard to be facilitated, is prevented. Thus, it is possible to suppress presence of non-dissolved foreign metal substances to an extremely small amount to such an extent that a micro short circuit does not occur over a predetermined aging time.

S5. Self-Discharge Test Step

Although not an indispensable step, in a suitable mode, after the above aging step S4, a self-discharge test may be further carried out. The self-discharge test is a test to determine a defective product (a battery in which an internal short circuit has occurred) by measuring the voltage drop amount of the cell. The internal short circuit to be tested is a micro short circuit due to foreign metal substances remaining at the positive electrode side, so, to accurately measure whether there is a micro short circuit, at least about five days in the existing art and, where necessary, a test time of about 10 days is required. This is mainly because, it is assumed that foreign metal substances having a low dissolution rate and a high resistance (typically, iron) remain inside the cell, a test time is set on the basis of the remark that five or more days are required in order to test the influence of the foreign substances. However, in the aging, even when the foreign metal substances are not completely dissolved, dissolution can be suitably facilitated to such an extent that a micro short circuit can occur. Therefore, the self-discharge test may be carried out by shortening the test time as compared to the existing one. For example, a required time of the self-discharge test may be, for example, within 24 hours (typically, within 15 hours, for example, within 10 hours, suitably for example, two hours to five hours). Therefore, a time that is required for the self-discharge test is shortened, so improvement of productivity may be achieved.

In the above-described embodiment, the technique is described on the assumption that the electrode assembly 20 is the flat rolled electrode assembly 20. However, the electrode assembly 20 is not limited to the flat rolled electrode assembly. For example, the electrode assembly 20 may be a plate stacked electrode assembly 20 in which the plate-shaped positive electrode 30 and the plate-shaped negative electrode 40 are stacked via the separator 50 in multiple sets. Although not specifically shown, the configuration including a plate stacked electrode assembly may also be similarly considered as in the case of the flat rolled electrode assembly 20. That is, the plate stacked electrode assembly is formed by stacking a plurality of the rectangular positive electrodes 30 and a plurality of the rectangular negative electrodes 40. The entire face of the negative electrode active material layer 44 contacts the separator 50. Therefore, the ends of the contact faces of the negative electrode active material layer 44 and the separator 50 are arranged all around in a band shape along the outer periphery of the rectangular negative electrode active material layer 44. The band-shaped outer peripheral portions (ends) of the negative electrode active material layer 44 and the separator 50 just need to be at least partially bonded to each other.

With the technique described here, the configuration for not causing foreign metal substances to be included is intrinsically implemented at the portion at which dissolution of foreign metal substances is hard to be facilitated. Therefore, for example, it is possible to significantly reduce the probability of occurrence of a delayed micro short circuit for the battery provided to the market as a result of passing the above-described self-discharge test. Thus, the high-quality and highly reliable nonaqueous electrolyte secondary battery in which an inconvenience, such as a decrease in capacity due to a micro short circuit and a decrease in safety during overcharging, is reduced is provided.

The nonaqueous electrolyte secondary battery 100 described here may be utilized in various applications, and can be provided as, for example, the one having a high capacity retention rate and a high safety (reliability) as described above in comparison with an existing product. Thus, for example, both the advantage, such as a high energy density, which can be intrinsically provided in the nonaqueous electrolyte secondary battery 100, and safety are achieved at high level. Such a configuration may also be suitably applied to a battery that requires a relatively large capacity (for example, a battery capacity of larger than or equal to 20 Ah, typically, larger than or equal to 25 Ah, for example, larger than or equal to 30 Ah). Therefore, by taking advantage of such a feature, the technique described here may be particularly suitably applied to a battery in an application that requires a high capacity, a high energy density, a cycle characteristic, and the like, and a battery in an application that requires high reliability. Such applications include, for example, a driving power supply mounted on a vehicle, such as a plug-in hybrid vehicle (PHV), a hybrid vehicle (HV) and an electric vehicle (EV). The lithium ion secondary battery can be typically used in a mode of a battery pack in which a plurality of lithium secondary batteries are connected in series with or parallel with each other.

Specific examples of the invention are described in detail; however, these are only illustrative and do not limit the appended claims. The techniques described in the appended claims encompass various modifications and changes from the specific examples illustrated above.

The invention claimed is:

1. A manufacturing method for a nonaqueous electrolyte secondary battery, comprising:

constructing a cell by accommodating an electrode assembly in a metal battery case, the electrode assembly including a positive electrode, a negative electrode and a separator, the positive electrode including a positive electrode active material layer, the negative electrode including a negative electrode active material layer, the separator being interposed between the positive electrode and the negative electrode, at least one of the negative electrode active material layer and the separator including a binder;

after accommodating the electrode assembly in the metal battery case, supplying a nonaqueous electrolyte into the metal battery case; and after accommodating the electrode assembly in the metal battery case, and in advance of supplying the nonaqueous electrolyte, at least partially bonding ends of contact faces of the negative electrode active material layer and the separator to each other by physical or chemical binding force of the binder, the positive electrode active material layer and the separator being not bonded to each other, the negative electrode and the separator being bonded to each other by heating while applying a pressure such that the ends of the contact faces of the negative electrode active material layer and the separator in the electrode assembly are at least partially pressed via the metal battery case from an outside of the metal battery case.

2. The manufacturing method according to claim 1, wherein the negative electrode active material layer includes a negative electrode active material and a binder, and the negative electrode and the separator are bonded to each other by, at the time of constructing the cell, bringing the negative electrode active material layer of the negative electrode and the separator into contact with each other and then heating while at least partially pressing the ends of the contact faces.

3. The manufacturing method according to claim 1, further comprising:

drying the cell after constructing the cell, wherein the negative electrode active material layer includes a negative electrode active material and a binder, and the bonding of the negative electrode and the separator occurring during the drying the cell.

4. The manufacturing method according to claim 2, wherein the pressure is higher than or equal to 0.01 MPa and lower than or equal to 1 MPa between the negative electrode active material layer and the separator in a temperature range higher than or equal to a softening point of the binder and lower than or equal to 125° C.

5. The manufacturing method according to claim 1, wherein the negative electrode and the separator are bonded to each other such that a peeling strength becomes larger than or equal to 0.2 N/m and smaller than or equal to 1.2 N/m.

6. The manufacturing method according to claim 1, further comprising:

applying aging.

7. The manufacturing method according to claim 3, wherein the pressure is higher than or equal to 0.01 MPa and lower than or equal to 1 MPa between the negative electrode active material layer and the separator in a temperature range higher than or equal to a softening point of the binder and lower than or equal to 125° C.

* * * * *